(12) United States Patent
Kramer

(10) Patent No.: US 7,198,445 B2
(45) Date of Patent: Apr. 3, 2007

(54) WASHER WITH CRUSH ZONE

(75) Inventor: Frederic Kramer, Sun Valley, CA (US)

(73) Assignee: Fan Disc Corporation, Sun Valley, CA (US)

( * ) Notice: Subject to any disclaimer, the term of this patent is extended or adjusted under 35 U.S.C. 154(b) by 0 days.

(21) Appl. No.: 11/145,377

(22) Filed: Jun. 3, 2005

(65) Prior Publication Data

US 2006/0275098 A1    Dec. 7, 2006

(51) Int. Cl.
*F16B 39/24*      (2006.01)
*F16B 42/02*      (2006.01)

(52) U.S. Cl. .................. 411/155; 411/156; 411/161; 411/544

(58) Field of Classification Search .............. 411/531, 411/533, 535, 536, 537, 538, 544, 545, 929.2, 411/953, 943, 371.1, 371.2, 999, 156
See application file for complete search history.

(56) References Cited

U.S. PATENT DOCUMENTS

| | | | | |
|---|---|---|---|---|
| 721,559 | A * | 2/1903 | Goodridge | 439/801 |
| 945,127 | A * | 1/1910 | Kollenberg | 411/156 |
| 1,320,259 | A * | 10/1919 | Martens | 411/149 |
| 1,384,019 | A * | 7/1921 | Johnston et al. | 411/270 |
| 1,547,162 | A * | 7/1925 | Bohlman | 411/533 |
| 1,724,394 | A * | 8/1929 | Chamberlain | 403/281 |
| 1,793,453 | A * | 2/1931 | Barili | 411/156 |
| 1,795,570 | A * | 3/1931 | Nilson | 411/132 |
| 1,801,999 | A * | 4/1931 | Bowman | 411/131 |
| 1,961,470 | A * | 6/1934 | Winchester et al. | 411/134 |
| 1,963,535 | A * | 6/1934 | Trotter | 411/156 |
| 2,278,062 | A * | 3/1942 | De Koharovich | 411/144 |
| 2,372,653 | A * | 4/1945 | Becket | 439/412 |
| 2,709,470 | A * | 5/1955 | Knohl | 411/134 |
| 2,781,687 | A * | 2/1957 | Knocke | 411/11 |
| 2,795,444 | A * | 6/1957 | Nenzell | 411/542 |
| 2,829,696 | A * | 4/1958 | Wagner | 411/386 |
| 3,037,221 | A * | 6/1962 | Lanius, Jr. | 470/4 |
| 3,181,584 | A * | 5/1965 | Borowsky | 411/134 |
| 3,218,906 | A * | 11/1965 | Dupree | 411/533 |
| 3,483,612 | A * | 12/1969 | Rogge | 29/520 |
| 3,606,357 | A * | 9/1971 | Yonkers | 411/537 |
| 3,631,910 | A * | 1/1972 | Crowther et al. | 411/149 |
| 3,659,491 | A * | 5/1972 | Duffy et al. | 411/436 |
| 3,678,979 | A * | 7/1972 | Bjorklumd | 411/134 |

(Continued)

OTHER PUBLICATIONS

French Standard "Serrated Conical Spring Washers" NF E 25-511, Oct. 20, 1984.

*Primary Examiner*—Robert J. Sandy
*Assistant Examiner*—Jeffrey A. Sharp
(74) *Attorney, Agent, or Firm*—Trojan Law Office

(57) ABSTRACT

A conical washer having a crush zone wherein the inner annular projection comprises a top and bottom elevation where the top elevation lies at an approximately 100 to 165 degree angle to the inner annular wall of the washer and the bottom elevation is substantially flush with the bottom surface of the washer. The inner annular projection forms a crush zone, which collapses and crushes when an attachment device passes through the washer and is tightened down by a user. The crush zone provides a tight engagement of fastener to the bearing surface, and one which eliminates looseness in the fastener upon thermal expansion of the metal of the elements.

4 Claims, 3 Drawing Sheets

U.S. PATENT DOCUMENTS

| | | | | |
|---|---|---|---|---|
| 3,687,184 A * | 8/1972 | Wagner | | 411/135 |
| 3,694,013 A * | 9/1972 | Heitner | | 52/200 |
| 3,777,796 A * | 12/1973 | Takano | | 411/134 |
| 3,881,392 A * | 5/1975 | Curtis | | 411/11 |
| 3,888,289 A * | 6/1975 | Reynolds | | 411/134 |
| 3,913,649 A * | 10/1975 | Stanaitis | | 411/134 |
| 3,960,048 A * | 6/1976 | Wagner | | 29/446 |
| 3,967,049 A * | 6/1976 | Brandt | | 174/53 |
| 3,992,974 A * | 11/1976 | Miki et al. | | 411/544 |
| 4,072,081 A * | 2/1978 | Curtis et al. | | 411/10 |
| 4,103,725 A * | 8/1978 | Abe | | 411/160 |
| 4,157,725 A * | 6/1979 | Stanaitis | | 411/147 |
| 4,193,434 A * | 3/1980 | Wagner | | 411/154 |
| 4,238,165 A * | 12/1980 | Wagner | | 403/408.1 |
| 4,257,465 A * | 3/1981 | Berg | | 411/147 |
| 4,292,007 A * | 9/1981 | Wagner | | 411/156 |
| 4,302,136 A * | 11/1981 | Abe et al. | | 411/158 |
| 4,347,024 A * | 8/1982 | Coldren | | 411/11 |
| 4,431,353 A * | 2/1984 | Capuano | | 411/11 |
| 4,435,112 A * | 3/1984 | Becker | | 411/368 |
| 4,971,498 A * | 11/1990 | Goforthe | | 411/134 |
| 5,011,351 A * | 4/1991 | Terry | | 411/144 |
| 5,085,550 A * | 2/1992 | Kendrick | | 411/432 |
| 5,323,984 A * | 6/1994 | Lackowski | | 242/348 |
| 5,407,313 A * | 4/1995 | Bruins et al. | | 411/544 |
| 5,489,177 A * | 2/1996 | Schmidt, Jr. | | 411/369 |
| 5,496,142 A * | 3/1996 | Fodor et al. | | 411/544 |
| 5,547,326 A * | 8/1996 | Overhues | | 411/544 |
| 5,597,279 A * | 1/1997 | Thomas et al. | | 411/432 |
| 5,667,347 A * | 9/1997 | Matthews | | 411/150 |
| 5,687,453 A * | 11/1997 | Megregian et al. | | 16/221 |
| 5,707,192 A * | 1/1998 | Vortriede et al. | | 411/175 |
| 5,769,581 A * | 6/1998 | Wallace et al. | | 411/10 |
| 5,827,025 A * | 10/1998 | Henriksen | | 411/11 |
| 5,829,933 A * | 11/1998 | Kramer | | 411/156 |
| 5,842,894 A * | 12/1998 | Mehlberg | | 439/801 |
| 5,904,460 A * | 5/1999 | Kawabata | | 411/155 |
| 5,931,618 A * | 8/1999 | Wallace et al. | | 411/10 |
| 6,062,790 A * | 5/2000 | Huang | | 411/531 |
| 6,070,946 A * | 6/2000 | Holmes | | 301/36.1 |
| 6,705,813 B2* | 3/2004 | Schwab | | 411/526 |
| 6,769,852 B2* | 8/2004 | Nilsen et al. | | 411/533 |
| 6,843,153 B1* | 1/2005 | Rawson-Harris | | 81/120 |
| 6,908,276 B2* | 6/2005 | Dohm | | 411/533 |
| 6,932,044 B1* | 8/2005 | Fenech | | 123/195 C |
| 6,959,627 B2* | 11/2005 | Doran | | 81/121.1 |
| 6,961,987 B2* | 11/2005 | Nilsen et al. | | 29/432.2 |
| 2003/0059279 A1* | 3/2003 | Gort | | 411/533 |
| 2003/0133771 A1* | 7/2003 | Dohm | | 411/533 |
| 2004/0234358 A1* | 11/2004 | Genick | | 411/533 |
| 2005/0008457 A1* | 1/2005 | Winker | | 411/533 |
| 2005/0158140 A1* | 7/2005 | Esser | | 411/156 |
| 2005/0260061 A1* | 11/2005 | Sung | | 411/533 |

* cited by examiner

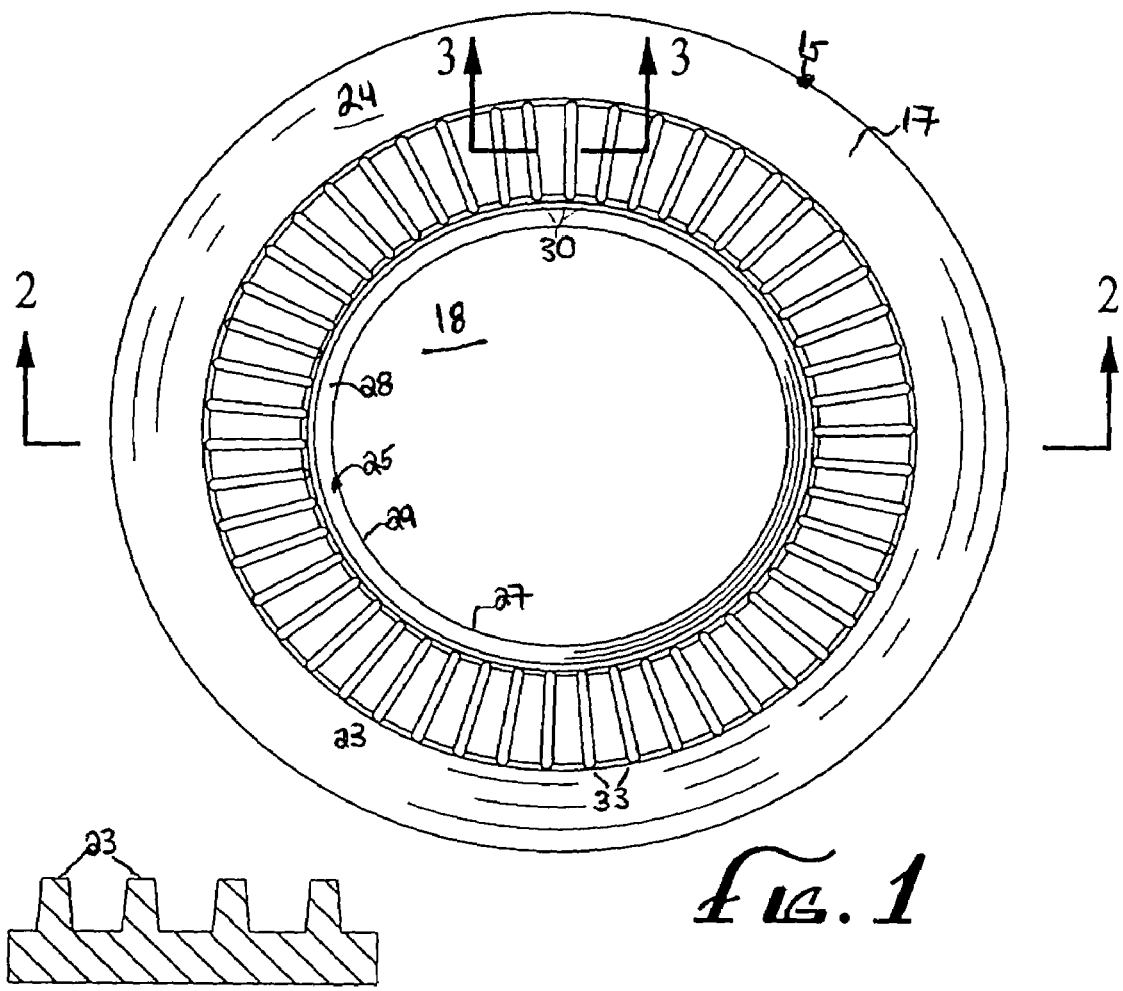
FIG. 1
FIG. 3
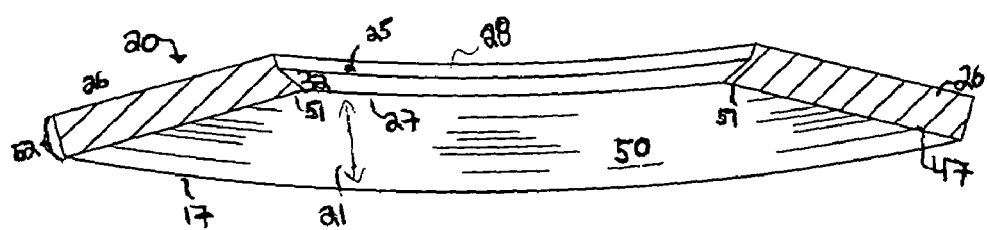
FIG. 2

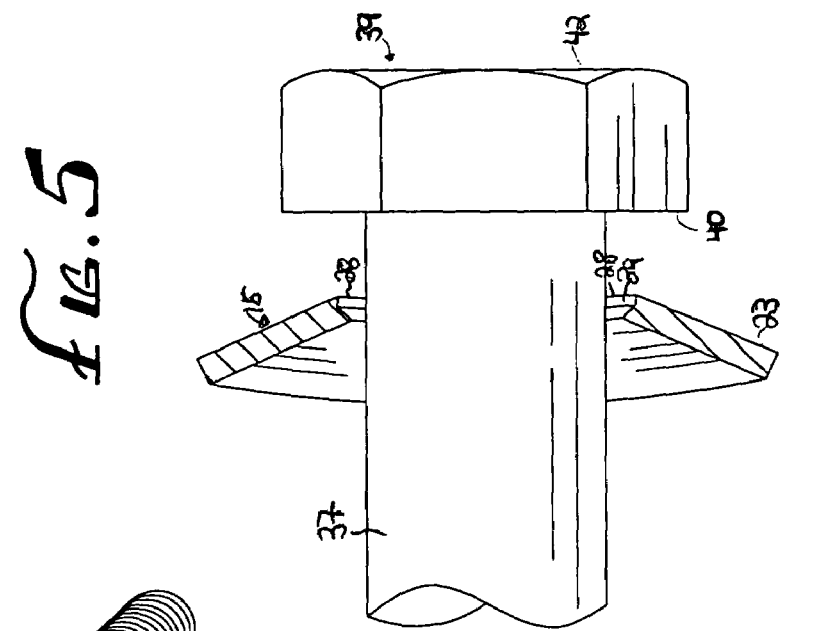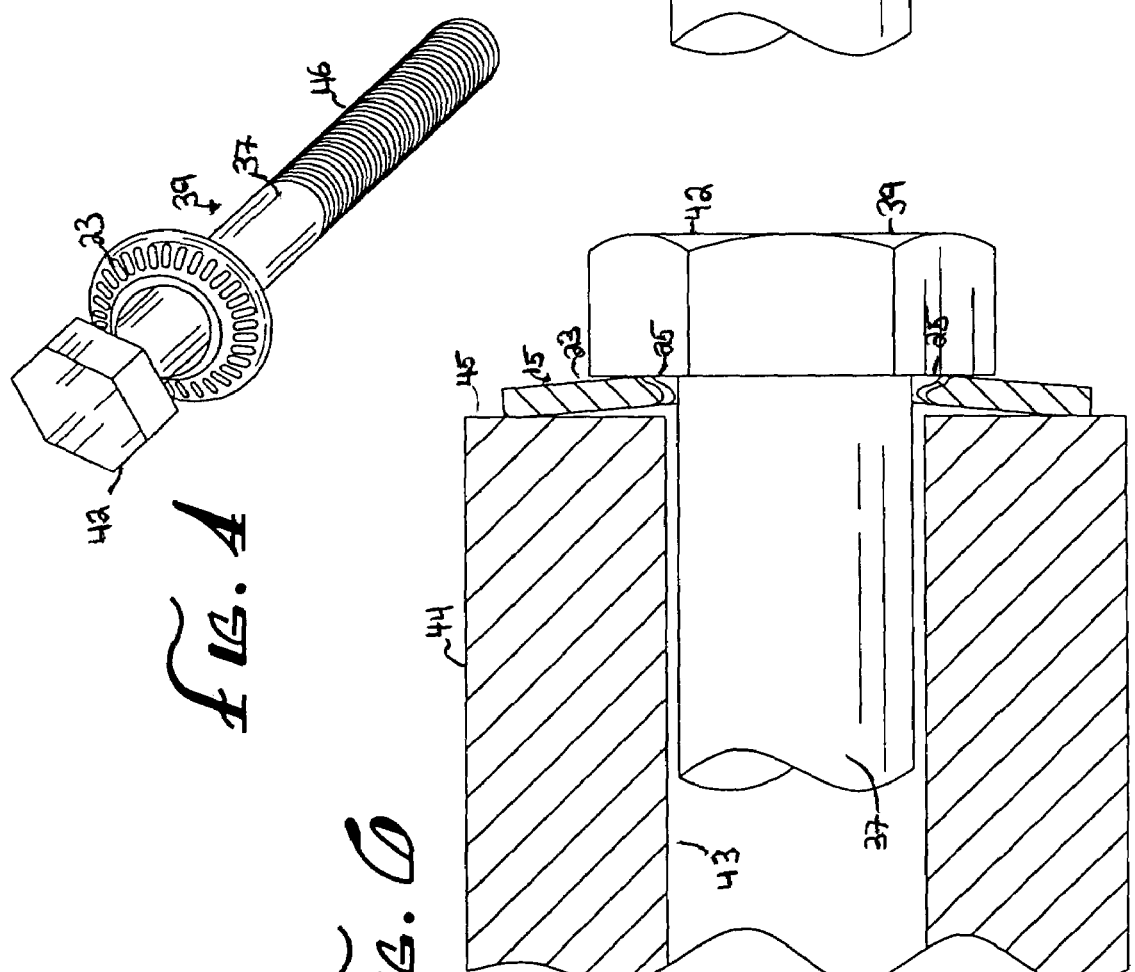

WASHER WITH CRUSH ZONE

FIELD OF THE INVENTION

The present invention relates to a washer and, particularly, relates to an improvement in a washer by having a crush zone, which permits greater flexing of the washer and obtains secure tightening thereof by preventing a bolt or a nut from loosening.

BACKGROUND OF THE INVENTION

In applications requiring heavy bolted sections, or in bus-bar applications, washers having a spring characteristic are known and have been used. One type in the art, long well-known and used, is a "Belleville spring" washer. However, due to thermal expansion of bolts in various engineering applications, a looseness is generated in the bolted sections. Statistics, in terms of a bolt clamping force vs. a tightening torque for bolts, have been generated to assist in knowing just what "Belleville spring" washer is best for the load (and its nature, such as electrical, for example) under consideration. While prior art consists of conical spring washers and washers with a relief to provide a tighter fastening, looseness has been found to creep into the bolted section when not desired.

Specifically, the prior art in U.S. Pat. No. 5,829,933 ('933) achieves a tight fastening through the combination of the serrations and a relief provided in the washer's top surface. The relief, however, does not permit sufficient flexing of the washer, and looseness still may be generated in the bolted sections. Besides the looseness, an additional disadvantage in the '933 patent is the lack of maintaining an optimal electrical connection if piercing or biting into insulation is required.

Similarly, prior art French Standard No. E 25-511 discloses a conical spring washer to provide a tighter fastening through serrations and the presence of an annular relief. The annular relief, however, similar to the '933 patent, does not permit for sufficient flexing of the washer, does not provide for a tight non-loosening connection of a bolt or nut to a bearing surface, and lacks the capability to allow for an optimal electrical connection.

Additional prior art consists of a plurality of projections provided on the bottom surface of a washer to prevent the washer from slipping on a contacting surface. The point of each of those projections is to bite into the bearing surface to maintain a tighter fastening of a bolt or nut to the bearing surface. The disadvantage, however, is that this allows for frictional damage or heating to occur on the contacting surface because of an uneven frictional coefficient between the washer and bearing surface.

In view of such difficulties, there is a need for a washer to provide a tighter fastening of a bolt or nut to the bearing surface in order to prevent a loosening connection, as well as to provide a better electrical connection.

SUMMARY OF THE INVENTION

This invention satisfies the needs left unmet by the prior art and improves the conical Belleville spring washer, and specifically improves upon the '933 Patent and '511 Standard, due to the existence of a crush zone. The crush zone allows for the crushing of the inner annular projection upon an attachment device passing through the washer and being tightened down by a user, such as a torquing of the fastener and washer, permitting for greater flexing of the washer in the tightening of a fastener or nut to the bearing surfaces. Accordingly, the primary object of the present invention is a novel Belleville spring washer.

The preferred embodiment of the present invention provides for a tight non-loosening connection of a bolt or nut to a bearing surface, eliminating undesired looseness in application and improves upon the prior art by allowing for a crush zone. The inner annular projection forms the crush zone and lies at an approximate 135-degree angle, plus or minus 10 degrees, to the inner annular wall. Said inner annular projection has sufficient thickness so it does not crush or break down without applied force yet has a designed thinness to permit deformation to occur.

An additional embodiment of the present invention contains teeth on the underside of the washer that can bite or pierce an insulated wire and cut through the insulation to make a better electrical connection.

The preferred embodiment of the present invention lies in a washer having a Belleville spring characteristic within its geometrical configuration and a series of radially extending serrations formed within the annular or radial body forming the washer. The inwardly disposed ends of the serrations terminate adjacent to the top edge of the inner annular wall and extend radially outwardly, sufficiently long to extend beyond the diametrical extremity of the head of the fastener to which it is to be mounted.

As an attachment device passes through said washer and is tightened down by a user, such as a fastener being torqued to, or as a nut is tightened down on a bearing surface, as the washer is being squashed in the tightening of fastener or nut to the bearing surface, the entire inner annular projection, which extends to the inner circumferential edge, collapses and crushes inward and downward. The result is a more positive hold of fastener or nut with the washer to a bearing surface, never achieved before with this type of washer. Looseness is virtually eliminated in various engineering applications, one example being in the case of a thermal expansion of the metals of fastener, washer and bearing surface body formation.

An additional embodiment contains an electrical version whereby the washer contains peripheral radially outwardly extending teeth, both axially projecting teeth and peripheral radially inwardly extending notches, that cut or pierce through insulation to make a better electrical connection. The number of teeth depends upon the diameter and size of the washer.

Thus, an object of this invention is to provide a novel Belleville spring washer, which is able to overcome the disadvantages of the prior art as mentioned above.

Another object of this invention is to eliminate looseness in the tightened arrangement of fastener and bearing surface by providing a better engagement between a fastener's head or a nut and their corresponding Belleville spring washer.

A further object of this invention is to provide for a better electrical connection.

These and other objects and advantages of the invention will become more apparent by a full and complete reading of the following description, the claims appended thereto, and the accompanying drawing comprising two (3) sheets of nine (9) FIGURES.

BRIEF DESCRIPTION OF DRAWINGS

For a more complete understanding of this invention, reference should now be had to the embodiments illustrated in greater detail in the accompanying drawings and described below by way of examples of the invention. In the drawings:

FIG. 1 is a plane view from above of a washer that is the subject matter of this invention FIG. 2 is a fragmentary view, somewhat in perspective from under the washer, taken on line 2—2 of FIG. 1.

FIG. 3 is a side view taken on line 3—3 of FIG. 1.

FIG. 4 is a perspective view of a mounting of the inventive washer to a fastener the example here being a block.

FIG. 5 is an enlarged fragmentary elevational view, partly in cross-section, of a fastener and the inventive washer mounted thereto prior to the collapse of the inner circumferential portion of the crush zone.

FIG. 6 is an enlarged fragmentary elevational view, partly in cross-section, of the fastener and inventive washer in a properly corrected torqued condition to a bearing surface with the collapse of the inner annular projection.

DETAILED DESCRIPTION OF THE PREFERRED EMBODIMENTS

Figure 7:
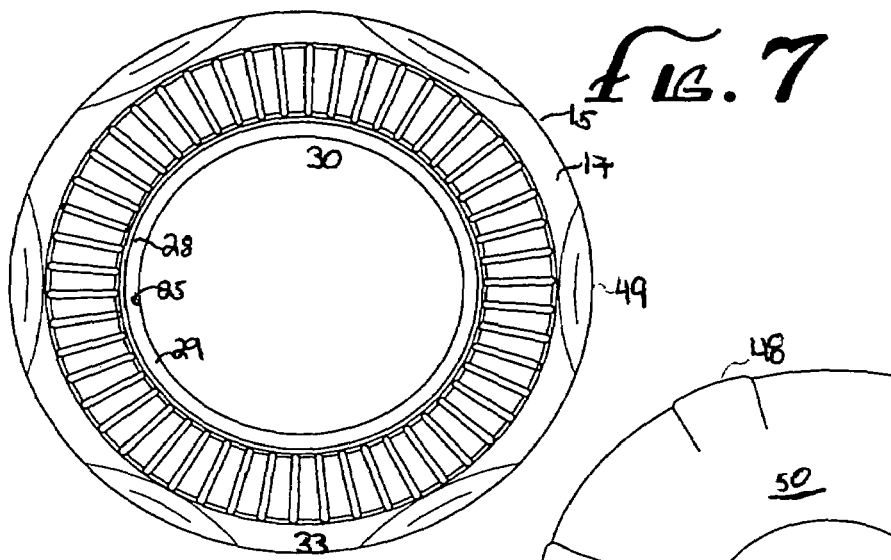
FIG. 7 is a plane view from above of an additional embodiment of the present invention showing a plurality of radially inwardly extending notches resulting from teeth projecting from the underside portion of said annular body.

Referring now to the drawing in which reference characters therein correspond to like numerals hereinafter, a conical washer 15 of the preferred embodiment of the inventive concept is illustrated in the views of FIGS. 1–3. Washer 15 is of the Belleville spring type comprising a top surface 24, a bottom surface 50, a thickness 52, an annular body 17 about a centrally located or disposed opening 18, and a Belleville configuration 20, FIG. 2, throughout the entire span 21 of the annular body 17. The configuration 20 of washer 15 is illustrated in FIG. 2 it being taken across a full diameter of the washer, and includes a concaved aspect to it, as is known for Belleville type washers.

In addition to such configuration 20, a series or plurality of radially extending serrations 23, FIGS. 1, 3, are formed in the top surface 24 of the annular body 17. Serrations 23 are spaced from one another, and disposed in a circumferential manner around the annular body 17, the number thereof in each washer 15 being determined by the size of the washer, their lengths not necessarily extending to the peripheral edge of the washer but may terminate in a peripheral ring-like manner within the span 21, FIG. 2, of annular body 17 itself, and as illustrated in the drawing FIGURES. The serrations 23 are uniform in their make-up and thereby formed during the formation of the washer 15 itself. It should be understood that serrations 23 of this nature have been known prior to this invention, but this invention utilizes a crush zone 25 in achieving the object of non-looseness in the tightened arrangement of fastener or nut to a bearing surface.

In the preferred embodiment, there is an inner annular projection having a top elevation 29 and a bottom elevation 51, and extends to the inner circumferential edge 27, wherein the top elevation 29 lies at an approximately 135-degree angle, plus or minus 10 degrees, to the inner annular wall 28 of the washer 15, and wherein the bottom elevation 51 is substantially flush with said bottom surface 50 of the range of 100 degrees to 165 degrees. The choice of angle is dependent upon such factors as the thickness of the projection and the hardness of the material used to make the washer. The greater hardness of the material used requires a greater angle to achieve the crushing effect of the invention. As the thickness of the material increases, a greater angle is needed to achieve the crushing effect of the invention.

Inner ends 30, FIG. 1, of the serrations 23 are disposed proximate to the inner annular wall 28, outside of the marginal portion 32, FIG. 2, of the annular body 17 out of which crush zone 25 is formed. Outer ends 33 of serrations 23 are disposed usually uniformly at a geometrically curved endless line (not shown) within the span 21 of annular body 17. It should be understood that depending upon the size of washer 15, which in turn depends on types and sizes of fasteners, some examples being socket-and-cap screw, standard hex bolt, and wide bolthead type, the lengths of the serrations will vary; nevertheless, the heads of the fasteners extend over the lengths of the serrations either to their full lengths or over a goodly portion of their lengths, in order that the crush zone maintains its full effect and the invention is operative.

In operation, washer 15 is mounted to the shank 37 of a fastener, such as a threaded bolt 39, FIG. 4, with serrations 23 facing the undersurface 40, FIGS. 5, 6 of a head 42 formed on the fastener. As an attachment device passes through said washer and is tightened down by a user, or by way of example, a fastener 39, such as in FIGS. 5 and 6, is then inserted into a bore 43, say, of a flange 44 having a bearing surface 45, a threaded portion 46 on the fastener, FIG. 4, preparing to mate with corresponding threads (not shown) formed in the body formation for bore head. Head 42 is rotated, say, manually, or by means of a wrench (not shown). As fastener 39 and washer 15 approach a tightened effect upon the bearing surface 45 by a torquing of the wrench, a crushing and collapsing of the inner annular projection occurs. Said inner annular projection forms a crush zone 25 capable of collapsing when any attachment device passes through said washer and is tightened down by a user. The inner annular projection has sufficient thickness to prevent the application of force, yet has minimal thinness to permit deformation to occur.

As the inner annular projection crushes, the washer 15 assumes a condition approaching a flattened state. It is known, however, that Belleville washers do not completely flatten upon a correct or proper torque setting notwithstanding the existence of the crush zone in the present embodiment. However, with or without a truly non-flattened condition, a tight efficacious bite of washer 15 to the underside of head 42, one never realized before in the use of a Belleville spring-type washer, is achieved by reason of the incorporation of crush zone 25.

It should be noted that the inner circumferential edge 27 of opening 18 of washer 15 before crushing occurs does not frictionally engage the shank 37 of the fastener; the opening was freely spinnable about the shank before torquing fastener (or nut) to bearing surface. After crushing, however, the circumferential edge 27 will be deformed and no longer spinnable in the tightened mode. In the event of a thermal expansion of the metals of the elements here—that of the flange, fastener (nut), and/or washer—and which in the past has shown that looseness is generated in the tightened mode for a Belleville spring washer—such looseness is eliminated with the application of washer 15, irrespective of any engineering or other theory supporting or negating the efficacious advantage of non-looseness in the application of washer 15.

Figure 8:
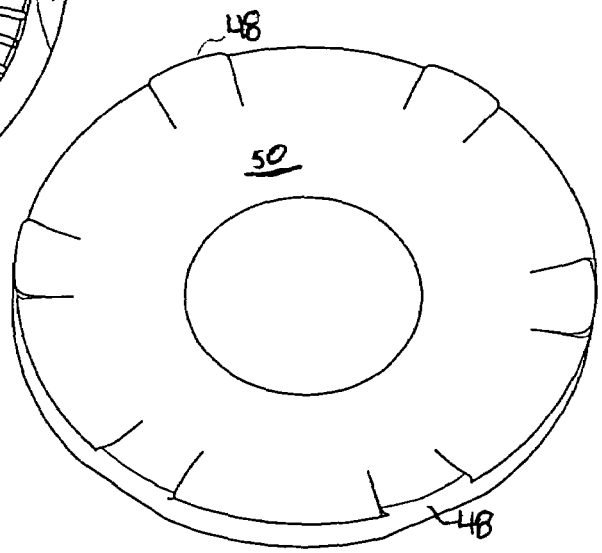
FIG. 8 is a plane view from the underside of an additional embodiment of the present invention showing a plurality of teeth projecting from the underside portion of said annular body.
Figure 9:
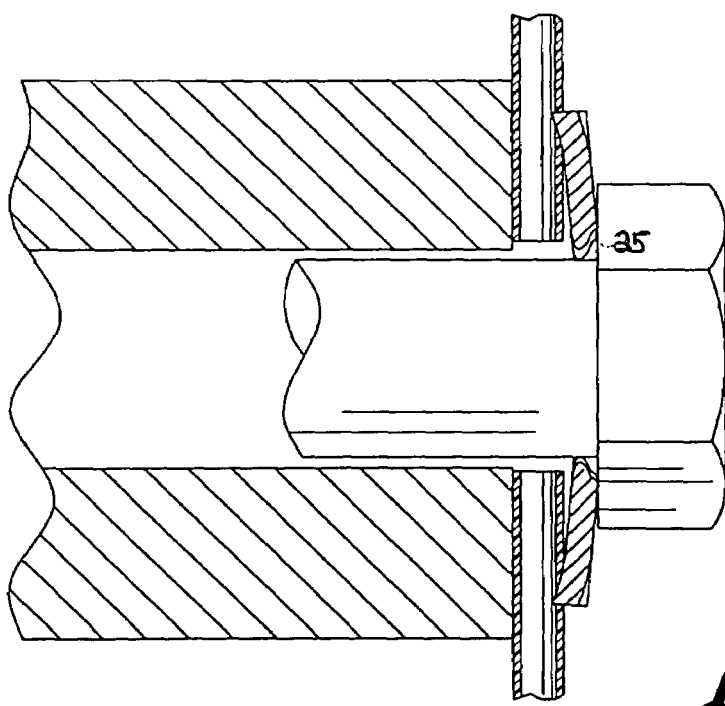
FIG. 9 is an enlarged fragmentary elevational view, partly in cross-section, of the fastener and inventive washer in a properly corrected torqued condition with the crush zone to a bearing surface showing one of many examples of the use of said axially projecting teeth in providing an electrical connection.

In another embodiment, FIGS. 7–8, still containing the crush zone 25, there exists a form of peripheral radially outwardly extending teeth, both axially projecting teeth 48 and peripheral radially inwardly extending notches 49, that cuts or pierces through any insulation to make an optimal electrical connection and permit the insulated wire to function. The number of teeth depends upon the size and diameter of the washer. One of many examples of the use of said axially projecting teeth 48 is provided in FIG. 9.

In the formation or making of the washer 15, a spring steel member or strip of such material of a given width and thickness, depending upon the size of the washer 15 to be produced, is fed through a progressive die. The inner diameter ("I.D.") forming the washer's opening 18 is punched out of the material. The die is piloted for alignment required in the next step. The die then impresses spaced serrations 23 upon the top surface 24 of the washer 15. The die is piloted on the I.D., after which it cuts the outer diameter and forms the height or concaved configuration for the washer 15. The bottom teeth 48 may be impressed at this time, if desired. Thereafter, washer 15 is heat-treated to the standard RC 42-50.

A range between low and high carbon steel material is utilized in the making of the washer 15, depending upon a particular application to which the washer 15 is to be put, usually already ascertained by the manufacturer or another ordering the washer 15.

Many modifications and variations are possible in light of the above teaching. The foregoing is a description of the preferred embodiments of the invention and has been presented for the purpose of illustration and description. It is not intended to be exhaustive and so limit the invention to the precise form disclosed.

What is claimed is:

1. A conical washer having a thickness, a top surface, a bottom surface, and an inner annular wall, the improvement comprising:

an inner annular projection having a top elevation and a bottom elevation; said top elevation being at an angle to said inner annular wall of said washer in a range of approximately 100 degrees to 165 degrees; said top elevation adjoining said inner annular wall; said top elevation adjoining said bottom elevation; said bottom elevation being substantially flush with said bottom surface of said washer; and, whereby said annular projection forms a crush zone capable of collapsing on an attachment device when said attachment device passes through said washer and is tightened down by a user.

2. The washer of claim 1, wherein said angle is between 125 degrees and 145 degrees.

3. The washer of claim 1 having a plurality of teeth, said teeth located peripherally on said bottom surface, said teeth projecting from said bottom surface and extending radially outward, wherein said plurality of teeth are capable of cutting through insulation of electrical components to achieve optimal electrical conduction therewith.

4. The washer of claim 1 having a plurality of radially extending serrations formed in the top surface, said serrations spaced from one another and disposed in a circumferential manner around said top surface.

* * * * *